US011333560B2

(12) United States Patent
Aliane et al.

(10) Patent No.: US 11,333,560 B2
(45) Date of Patent: May 17, 2022

(54) TEMPERATURE SENSOR WITH HEAT-SENSITIVE PASTE

(71) Applicant: Commissiariat à l'Energie Atomique et Aux Energies Alternatives, Paris (FR)

(72) Inventors: Abdelkader Aliane, Grenoble (FR); Romain Coppard, Voiron (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 744 days.

(21) Appl. No.: 14/895,967

(22) PCT Filed: Jun. 3, 2014

(86) PCT No.: PCT/FR2014/051319
§ 371 (c)(1),
(2) Date: Dec. 4, 2015

(87) PCT Pub. No.: WO2014/195631
PCT Pub. Date: Dec. 11, 2014

(65) Prior Publication Data
US 2016/0131537 A1 May 12, 2016

(30) Foreign Application Priority Data

Jun. 4, 2013 (FR) .................................... 13/55083
Jun. 4, 2013 (FR) .................................... 13/55084

(51) Int. Cl.
*G01K 7/00* (2006.01)
*G01K 7/16* (2006.01)
*H01C 17/00* (2006.01)

(52) U.S. Cl.
CPC .............. *G01K 7/16* (2013.01); *H01C 17/00* (2013.01)

(58) Field of Classification Search
None
See application file for complete search history.

(56) References Cited

U.S. PATENT DOCUMENTS 3,673,121 A * 6/1972 Meyer ....................... H01B 1/22
252/511
4,279,984 A * 7/1981 Matsuda ................... G03F 7/039
427/504
(Continued)

FOREIGN PATENT DOCUMENTS

EP 0125366 A1 11/1984
EP 1492131 A1 12/2004
(Continued)

OTHER PUBLICATIONS

EPO translation of JPH0552659, Mar. 2, 1993.*
(Continued)

Primary Examiner — Lisa M Caputo
Assistant Examiner — Nasir U. Ahmed
(74) Attorney, Agent, or Firm — Moreno IP Law LLC

(57) ABSTRACT

A heat-sensitive resistor with a negative or positive temperature coefficient comprises respectively an antimony-doped tin oxide-based resistive element or a carbon black-based resistive element, containing a polymer having a dielectric constant between 2 and 3, a molar mass between 50000 and 150000 g/mol, and a glass transition temperature Tg between 40 and 100° C.

14 Claims, 6 Drawing Sheets

(56) References Cited

U.S. PATENT DOCUMENTS

| | | | | |
|---|---|---|---|---|
| 4,327,697 | A | * | 5/1982 | Wada .................. F02M 29/04 123/549 |
| 5,993,698 | A | * | 11/1999 | Frentzel ............... H01C 7/028 252/511 |
| 6,511,156 | B1 | * | 1/2003 | Kazama ............... B41J 2/1433 347/47 |
| 6,951,419 | B2 | | 10/2005 | Tsuchiya |
| 8,198,978 | B2 | * | 6/2012 | Schultes ................ G01L 1/18 29/620 |
| 2005/0062581 | A1 | * | 3/2005 | Koyama ................ G01K 7/22 338/22 R |
| 2007/0279182 | A1 | * | 12/2007 | Kodas ................ H01C 17/065 338/22 R |
| 2008/0079532 | A1 | * | 4/2008 | Liu ...................... H01C 7/112 338/13 |
| 2012/0248092 | A1 | * | 10/2012 | Uhland .................. H01C 7/02 219/546 |
| 2013/0200989 | A1 | | 8/2013 | Miura |
| 2014/0113828 | A1 | * | 4/2014 | Gilbert ............... H01L 39/126 505/100 |

FOREIGN PATENT DOCUMENTS

| | | |
|---|---|---|
| EP | 2506269 A1 | 10/2012 |
| FR | 1571105 A | 6/1969 |
| FR | 2851404 A1 | 8/2004 |
| JP | 2012002692 A | 1/2012 |
| WO | 2012035938 A1 | 3/2012 |

OTHER PUBLICATIONS

Wayback machine archived document of Polystyrene from Wikipedia, May 2, 2012. (Year: 2012).*

International Search Report filed in PCT/FR2014/051319 dated Sep. 15, 2014.

English Translation of the International Preliminary Report on Patentability filed in PCT/FR2014/051319 dated Sep. 15, 2014.

* cited by examiner

TEMPERATURE SENSOR WITH HEAT-SENSITIVE PASTE

BACKGROUND

The present disclosure relates to the field of temperature detection and of thermal imaging with temperature detection elements made of resistive pastes.

DISCUSSION OF THE RELATED ART

Sensors adapted to temperature detection and thermal imaging made of printed resistive pastes on a low-cost plastic substrate, possibly flexible, are known. Such sensors are for example used to measure the temperature of an object or to measure a thermal gradient for thermal imaging with a maximum sensitivity and accuracy.

Resistive pastes with a negative temperature coefficient, currently called NTC, are for example based on a metal oxide such as antimony tin oxide of chemical formula $Sb_2O_5SnO_2$ or ATO. Heat-sensitive resistive pastes with a positive temperature coefficient, currently called PTC, are currently based on carbon black. In a PTC resistor, the value of the electric resistance increases as the temperature increases. In a NTC resistor, the value of the electric resistance decreases as the temperature increases.

Further, rather than using a heat-sensitive resistor alone, it is known, to increase the measurement accuracy, to assemble NTC and PTC resistors in a Wheatstone bridge.

SUMMARY

An object of the present application is to improve the sensitivity of resistive paste heat-sensitive resistors.

Another object of the present application, more particularly adapted to the Wheatstone bridge assembly, is to increase the resistance value of resistive paste heat-sensitive resistors.

Thus, an embodiment provides a heat-sensitive resistor of negative or positive temperature coefficient, respectively comprising a resistive element based on antimony tin oxide or a resistive element based on carbon black, containing a polymer having a dielectric constant between 2 and 3, a molar mass between 50,000 and 150,000 g/mol, and a glass transition temperature Tg between 40 and 100° C.

According to an embodiment, the polymer belongs to the family of styrenic polymers or to the family of fluorinated polymers.

According to an embodiment, the resistive element comprises from 5% to 40% by mass of dry extract of the polymer with respect to the total mass of the resistive element.

An embodiment also provides a heat-sensitive resistor of positive temperature coefficient having an adjustable temperature threshold with a resistance which is constant below said threshold and which increases along with temperature above said threshold, comprising, in series, a first resistive track made of a heat-sensitive paste of positive temperature coefficient, PTC, and a second resistive track made of a heat-sensitive paste of negative temperature coefficient, NTC.

An embodiment also provides a method of manufacturing a heat-sensitive resistor of negative temperature coefficient, comprising the steps of:

forming a first solution comprising antimony tin oxide or carbon black containing a polymer having a dielectric constant between 2 and 3, a molar mass between 50,000 and 150,000 g/mol, and a glass transition temperature Tg between 40 and 100° C.;

forming portions of the first solution on a support; and heating the portions.

According to an embodiment, the step of manufacturing the first solution comprises the steps of:

providing a second solution comprising antimony tin oxide or carbon black and a first solvent;

providing a third solution comprising the polymer and a second solvent; and mixing the second and third solutions.

According to an embodiment, the third solution is by a mass proportion smaller than 30%, preferably from 10 to 30%, with respect to the total mass of the first solution.

According to an embodiment, the third solution comprises from 15 to 30% by mass, for example, 25%, of the polymer in from 85 to 70% by mass, for example, 75%, of the second solvent.

According to an embodiment, the first solvent is selected from the group comprising cyclopentanone, ethyl acetate, tetrahydrofuran, acetone, 3-hexanone, and 2-pentanone for antimony tin oxide or the group comprising cyclopentanone, dibutyl carbitol, and ethylene glycol diacetate for carbon black.

According to an embodiment, the second solvent has an evaporation temperature in the range from 100 to 170° C.

According to an embodiment, the polymer belongs to the family of styrenic polymers or to the family of fluorinated polymers.

According to an embodiment, the second solvent is selected from the group comprising toluene or butyl acetate for styrenic polymers or perfluorotributylamine (FC43) for fluorinated polymers.

According to an embodiment, the evaporation temperature of the first solvent is higher than the evaporation temperature of the second solvent.

An embodiment also provides a method of manufacturing a heat-sensitive resistor of positive temperature coefficient having an adjustable temperature threshold with a resistance which is constant below said threshold and which increases along with temperature above said threshold, comprising the steps of:

forming in series on the support a first portion made of a heat-sensitive paste of positive temperature coefficient, PTC, and a second portion made of a heat-sensitive paste of negative temperature coefficient, NTC, the first and/or the second portion being formed with the first solution; and heating the first and second portions to form first and second resistive tracks.

BRIEF DESCRIPTION OF THE DRAWINGS

The foregoing and other features and advantages of the present invention will be discussed in detail in the following non-limiting description of specific embodiments in connection with the accompanying drawings, among which.

DETAILED DESCRIPTION

Figure 1A:
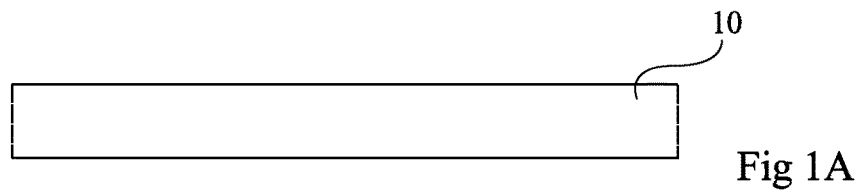
FIGS. 1A to 1D show the structures obtained at steps of an embodiment of a method of manufacturing NTC and PTC resistors.

For clarity, the same elements have been designated with the same reference numerals in the various drawings and, further, the various drawings are not to scale. In the following description, unless otherwise indicated, terms "substantially", "approximately", and "in the order of" mean "to within 10%". Further, only those elements which are useful to the understanding of the present description have been shown and will be described. In particular, the processing of the signals provided by the temperature sensors are well known by those skilled in the art and are not described any further.

It should be noted that, in the following, the examples are given for sensors formed of heat-sensitive ink deposited on flexible substrates of PEN (polyethylene naphthalate) or PET (polyethylene terephthalate) type. However, the present invention also applies to the case where the substrate is a rigid substrate, for example, a glass substrate.

Also, the examples are given in the case where detection temperatures from 50 to 120° C. are targeted.

Generally, it is provided herein to add a polymer to a conventional NTC or PTC resistor ink, for example, an ink based on $Sb_2O_5SnO_2$ for the NTC ink and an ink based on carbon black for the PTC ink. The polymer has a dielectric constant in the range from 2 to 3, a molar mass (characterizing the chain length) in the range from 50,000 g/mol to 150,000 g/mol, and a glass transition temperature Tg in the range from 40° C. to 100° C. This polymer may belong to the family of styrenic polymers or to the family of fluorinated polymers. The dielectric constant of a material, also called relative permittivity, is equal to the ratio of the permittivity of the material to the permittivity of vacuum.

NTC Ink:

The NTC resistive paste or ink comprises a solution of ATO ink ($Sb_2O_5SnO_2$) and of a polymer (P) such as defined hereabove.

The method of preparing the NTC ink is the following. A solution of the polymer is prepared. The insulating polymer may be dissolved in a solvent having an evaporation temperature in the range from 100 to 170° C., for example, toluene (110° C. evaporation temperature), butyl acetate (118° C. evaporation temperature) for styrenic polymers or perfluorotributylamine (FC43, 165° C. evaporation temperature) for fluorinated polymers, with the following proportions relative to the total mass of the polymer solution: from 15 to 30% by mass, for example 25%, of the polymer and from 85 to 70% by mass, for example 75%, of the solvent.

A solution of ATO ink which may correspond to the product commercialized by DuPont under trade name D7164 is further used.

The solution of ATO ink may comprise one of the following solvents: cyclopentanone, ethyl acetate, tetrahydrofuran, 3-hexanone, 2-pentanone, or acetone. The ATO ink solution may comprise from 20% to 80% by mass of ATO and from 20% to 80% by mass of solvent.

The obtained polymer solution is mixed with the solution of ATO ink ($Sb_2O_5SnO_2$) with proportions by mass smaller than 30%, preferably from 10 to 30% with respect to the total mass of the obtained solution containing the polymer and the ATO. The obtained solution comprising the polymer and the ATO is then stirred for from 10 to 30 minutes at ambient temperature. The proportions used to manufacture the mixture enable to adapt the viscosity to a silk screening deposition.

PTC Ink

The PTC resistive paste or ink comprises a solution of carbon black and of a polymer (P) such as defined hereabove.

The method of preparing the PTC ink is the following. A solution of the polymer is prepared. The insulating polymer may be dissolved in a solvent having an evaporation temperature in the range from 100 to 170° C., for example, toluene (110° C. evaporation temperature), butyl acetate (118° C. evaporation temperature) for styrenic polymers, or perfluorotributylamine (FC43, 165° C. evaporation temperature) for fluorinated polymers, with the following percentages with respect to the total mass of the polymer solution: from 15 to 30% by mass, for example 25%, of the polymer and from 85 to 70% by mass, for example 75%, of the solvent.

A solution of carbon black which may correspond to the product commercialized by DuPont under trade name D7282 is further used. The carbon black solution may comprise cyclopentanone, dibutyl carbitol, or diacetate ethylene glycol as a solvent. The carbon black solution may comprise from 40% to 90% by mass of carbon black and from 10% to 60% by mass of solvent.

The obtained polymer solution is mixed with the solution of carbon black with mass proportions smaller than 30%, preferably from 10 to 30% with respect to the total mass of the obtained solution containing the polymer and the carbon black. The obtained solution comprising the polymer and the carbon black is then stirred for from 10 to 30 minutes at ambient temperature. The proportions used to manufacture the mixture enable to adapt the viscosity to a silk screening deposition.

The inventors have shown that, if a proportion of 30% by mass of the polymer solution in the solution containing the polymer and the ATO or the solution containing the polymer and the carbon black is exceeded, the printed layers may exhibit pores (holes), which may very strongly degrade the operation of the printed temperature sensor.

Heat-sensitive resistors using the resistive pastes modified by addition of a polymer such as described hereabove may be manufactured on a flexible plastic substrate of polyethylene naphthalate (PEN) type or of polyethylene terephthalate (PET) type, or even on glass, for example, according to a method mainly comprising the steps described hereafter.

The manufacturing method comprises a step of depositing portions of the polymer solution and of ATO ink and/or of depositing portions of the polymer solution and of carbon black. This deposition step is followed by a drying step to evaporate all the solvents of the polymer and ATO ink solution and/or of the polymer and carbon black solution.

After drying, the obtained dry NTC ink comprises from 5% to 40%, preferably from 10% to 30%, by mass of dry polymer extract and from 60% to 95%, preferably from 70% to 90%, by mass of dry ATO extract with respect to the total mass of the dry NTC ink.

After drying, the obtained dry PTC ink comprises from 5% to 40%, preferably from 10% to 30%, by mass of dry polymer extract and from 60% to 95%, preferably from 70% to 90%, by mass of dry carbon black extract with respect to the total mass of the dry PTC ink.

FIGS. 1A to 1D show the structures obtained at steps of an embodiment of a method of manufacturing NTC and PTC resistors comprising the steps of:

(1) Preparing a PEN or PET substrate 10 (FIG. 1A). The PEN and PET substrates are crystalline and have respective glass transition temperatures of 120 and 70° C. The thickness of substrate 10 may be from 50 to 200 μm, for example, 125 μm. A small thickness favors the heat transfer dynamics in the final sensor.

Figure 1B:
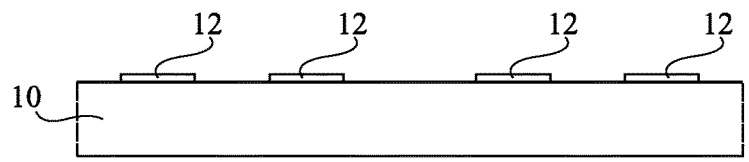

(2) Electrodes 12 forming the electric contacts and the electric tracks of the temperature sensor are deposited and etched (FIG. 1B). Electrodes 12 may be made of Au, Cu, Ag, Ti . . . and may be deposited by physical vapor deposition (PVD). Electrodes made of silver or copper (or even of conductive polymer such as PEDOT:PSS:poly(3,4-ethylenedioxythiophene):poly(styrene sulfonate)) may be deposited by silk screening or by inkjet.

(3) Step (2) is directly followed by a treatment under oxygen plasma with a 50-sccm flow rate and a 80-W power for 60 seconds to remove residues from the surface and improve the adherence of heat-sensitive resistive pastes. A UV/$O_3$ treatment (ultraviolet/ozone) for from 3 to 5 minutes of the substrate is also desirable.

Figure 1C:
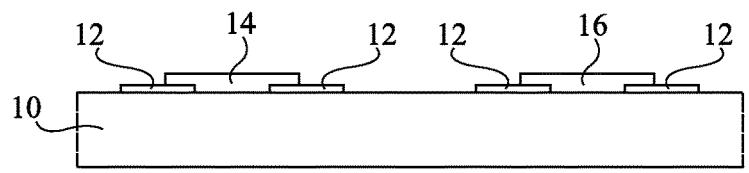

(4) Portions 14, 16 of heat-sensitive NTC and/or PTC polymer doped resistive pastes are deposited (FIG. 1C). According to an embodiment, the portions are made of a resistive paste of same nature, NTC or PTC. According to an embodiment, the portions are made of NTC and PTC resistive pastes. In this case, the PTC resistive paste portions are formed after the NTC resistive paste portions or, conversely, the NTC resistive paste portions are formed after the PTC resistive paste portions. Portions 14, 16 are for example in contact with certain electric tracks 12. Each of the depositions may be performed by silk-screening and may be followed by an anneal at 130° C. for from 15 to 30 minutes (preferably for 30 minutes). The thickness of the deposited portions 14, 16 may be from 5 to 15 μm, for example, 10 μm. Preferably, the evaporation temperature of the solvent present in the ATO ink solution or in the carbon black solution is higher than the evaporation temperature of the solvent present in the polymer solution used to manufacture the NTC and PTC inks. Thereby, the solvent present in the polymer solution evaporates before the solvent present in the ATO ink solution or in the carbon black solution. The ATO ink or carbon black solution then spreads into the housings of the polymer network freed by the evaporation of the solvent of the polymer solution. The forming of too significant a porosity of portions 14, 16 after all the solvents have evaporated is thus avoided.

Figure 1D:
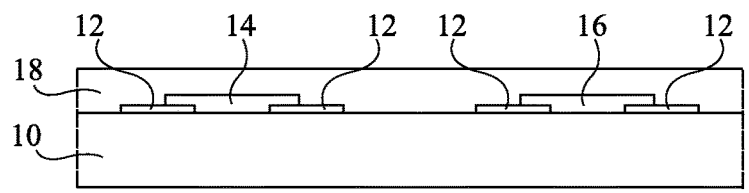

(5) A passivation layer 18 is deposited (FIG. 1D). Layer 18 may be a hydrophobic passivation layer based on a fluorinated polymer of low dielectric constant, in the order of 2. As an example, this deposition is performed by silk-screening or by sputtering or even by inkjet and is followed by an anneal at 100° C. for from 20 to 30 minutes. Step (5) may be absent.

Figure 2:
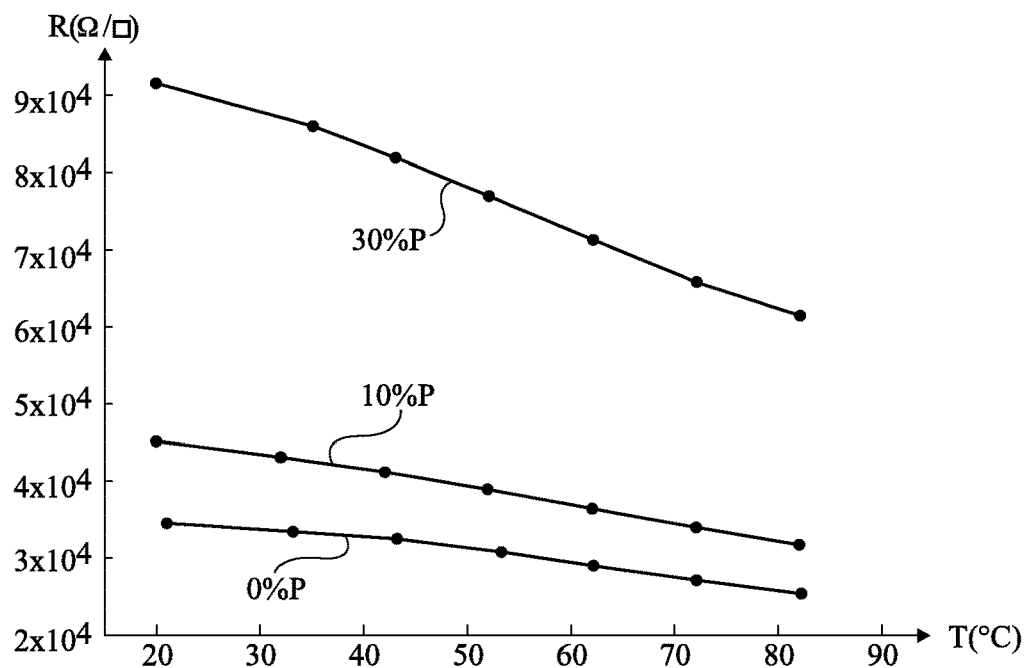
FIG. 2 shows curves of the temperature variation characteristic of the resistance in ohms/square for a plurality of NTC resistors.

FIG. 2 shows curves of the variation of the characteristics of the resistance in ohms/square (/) according to temperature for a NTC resistive paste based on ATO with no addition of polymer (0% P), for a NTC resistive paste based on ATO with an addition of 10% by mass of polymer solution with respect to the total mass of the solution containing the polymer and the ATO (10% P), and for a NTC resistive paste based on ATO with an addition of 30% by mass of polymer solution with respect to the total mass of the solution containing the polymer and the ATO (30% P). The curves of FIG. 2 have been obtained for a NTC resistive paste thickness of 5 μm.

Figure 3:
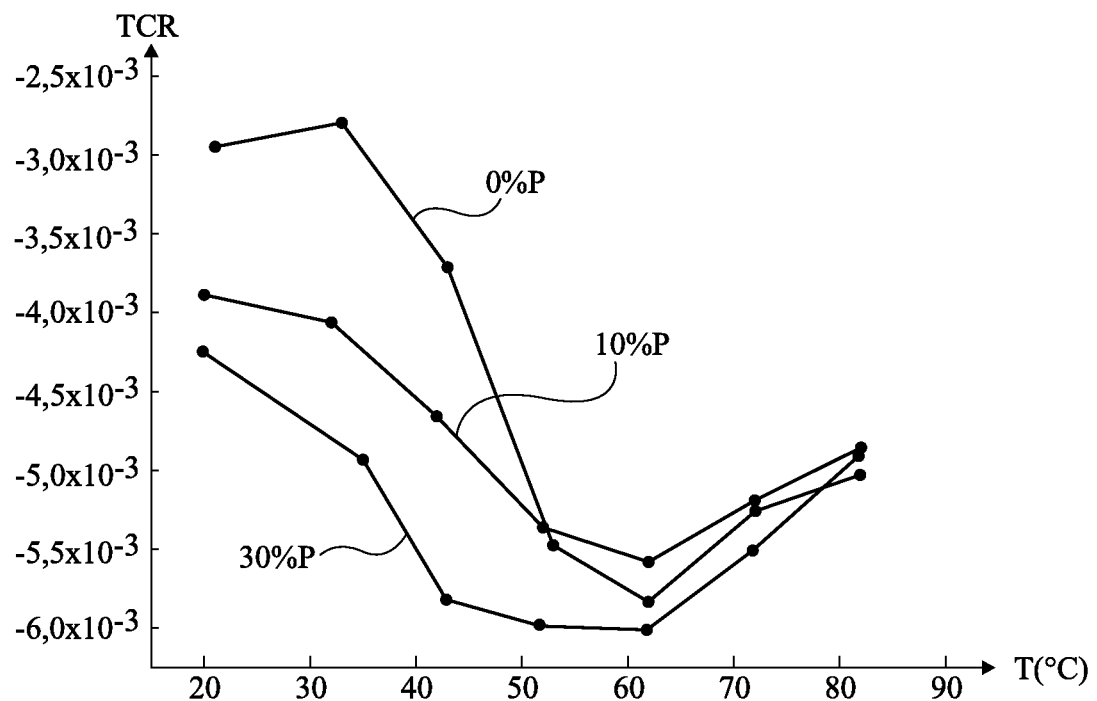
FIG. 3 shows curves of the variation of the sensitivity of the NTC resistors of FIG. 1 according to temperature.

FIG. 3 shows curves of the variation of the temperature coefficient of resistance (TCR) equal to $(1/R)(dR/dT)$ for the three types of resistor considered in FIG. 2.

It can be observed that the introduction of the polymer into the ATO increases the resistivity and the temperature sensitivity thereof. With 30% by mass of polymer solution with respect to the total mass of the solution containing the polymer and the ATO, at 20° C., a resistance per square of 100/instead of 30/without polymer is reached. The temperature coefficient of resistance (TCR), equal to $(1/R) \times (dR/dT)$, increases in absolute value (it is negative in the case of the NTC ink); this increase is particularly significant in the range from 20 to 55° C.

Figure 4:
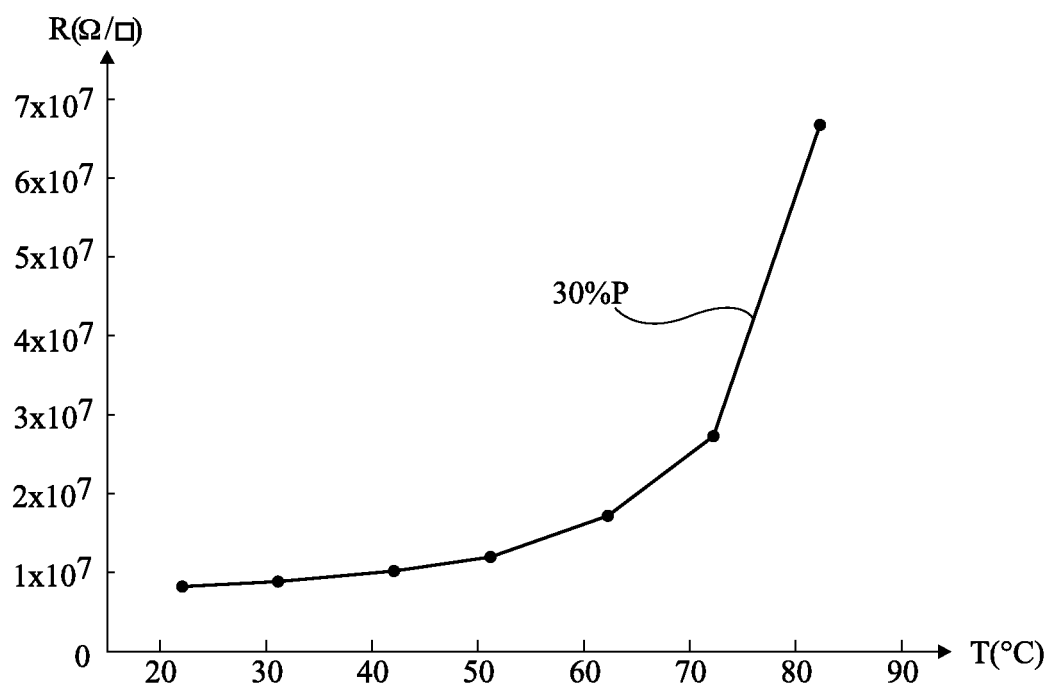
FIG. 4 shows a curve of the temperature variation of the resistance in ohms/square of a PTC resistor.

FIG. 4 shows a curve of the variation of the resistance according to temperature for a PTC resistive paste obtained with a proportion of 30% in solution of polymer with respect to the total mass of the solution containing the polymer and the carbon black. The curve of FIG. 4 has been obtained for a PTC resistive paste thickness of 5 μm. The corresponding curves for 0 and 10% by mass of polymer solution with respect to the total mass of the solution containing the polymer and the carbon black are not illustrated. They have the same shape but the resistance values are smaller by several orders of magnitude. For example, for the polymer-free case, the resistance at 20° C. is $5.10^4$/instead of $1.10^7$/ and the resistance at 80° C. is $3.10^5$/instead of $7.10^7$/.

Figure 5:
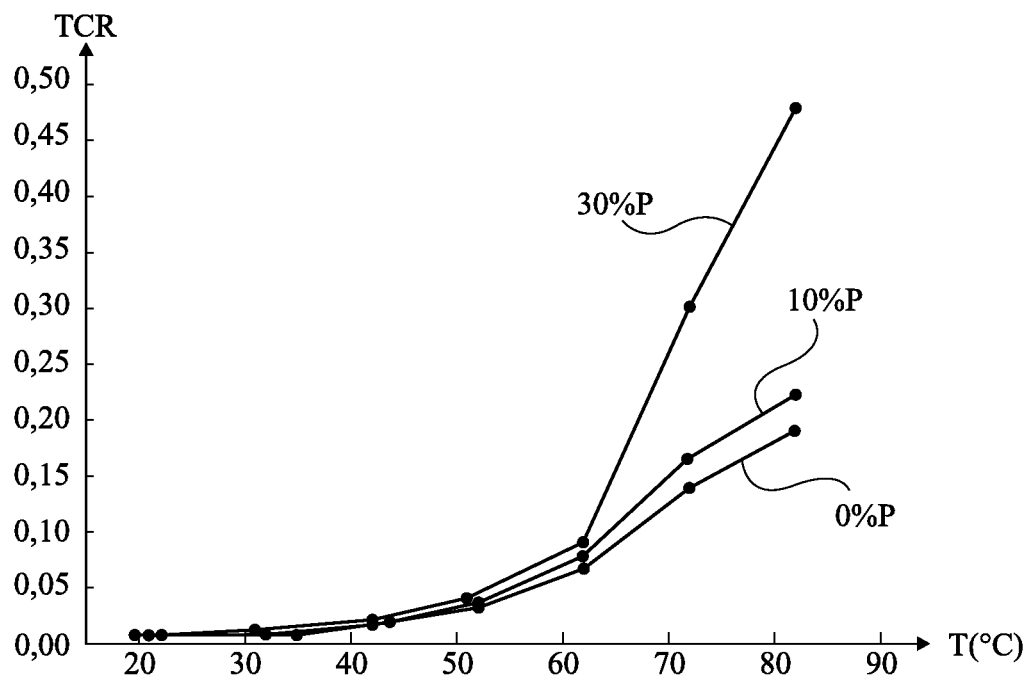
FIG. 5 shows curves of the variation of the sensitivity according to temperature of PTC resistors.

FIG. 5 shows the influence of the addition of the polymer on the sensitivity of the PTC resistor. It can be seen that starting from 60° C., the sensitivity (TCR) of the resistor containing 30% of polymer is much greater than that of resistors containing 10% of polymer or no polymer.

The inks described herein may advantageously be used in temperature sensors with a Wheatstone bridge assembly.

Figure 6:
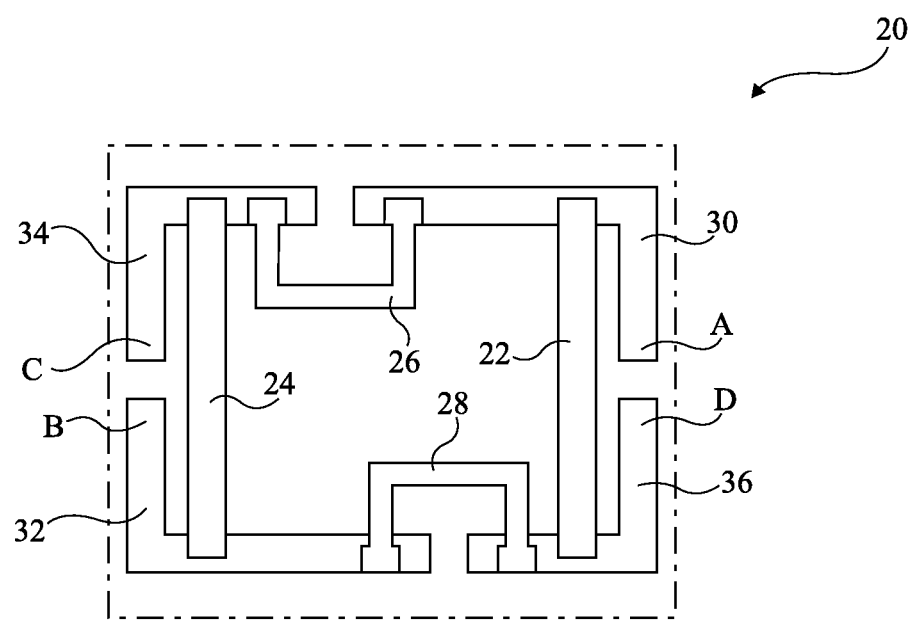
FIG. 6 is a simplified top view of an example of a Wheatstone bridge comprising NTC and PTC resistors.

FIG. 6 partially and schematically shows an example of PTC and NTC resistors arranged as a Wheatstone bridge.

Wheatstone bridge 20 may be formed by implementing the embodiment of manufacturing method previously described in relation with FIGS. 1A to 1D.

Wheatstone bridge 20 comprises two input terminals A and B between which is applied a power supply voltage $V_{in}$ and two output terminals C and D having a voltage $V_G$ measured therebetween. Wheatstone bridge 20 comprises two PTC resistors 22, 24 and two NTC resistors 26, 28 and four conductive tracks 30, 32, 34, and 36. One end of PTC resistor 22 is connected to terminal A by conductive track 30 and the other end of PTC resistor 22 is connected to terminal D by conductive track 36. One end of PTC resistor 24 is connected to terminal B by conductive track 32 and the other end of PTC resistor 24 is connected to terminal C by conductive track 34. One end of NTC resistor 26 is connected to terminal A by conductive track 30 and the other end of NTC resistor 26 is connected to terminal C by conductive track 34. One end of NTC resistor 28 is connected to terminal B by conductive track 32 and the other end of NTC resistor 28 is connected to terminal D by conductive track 36.

Figure 7:
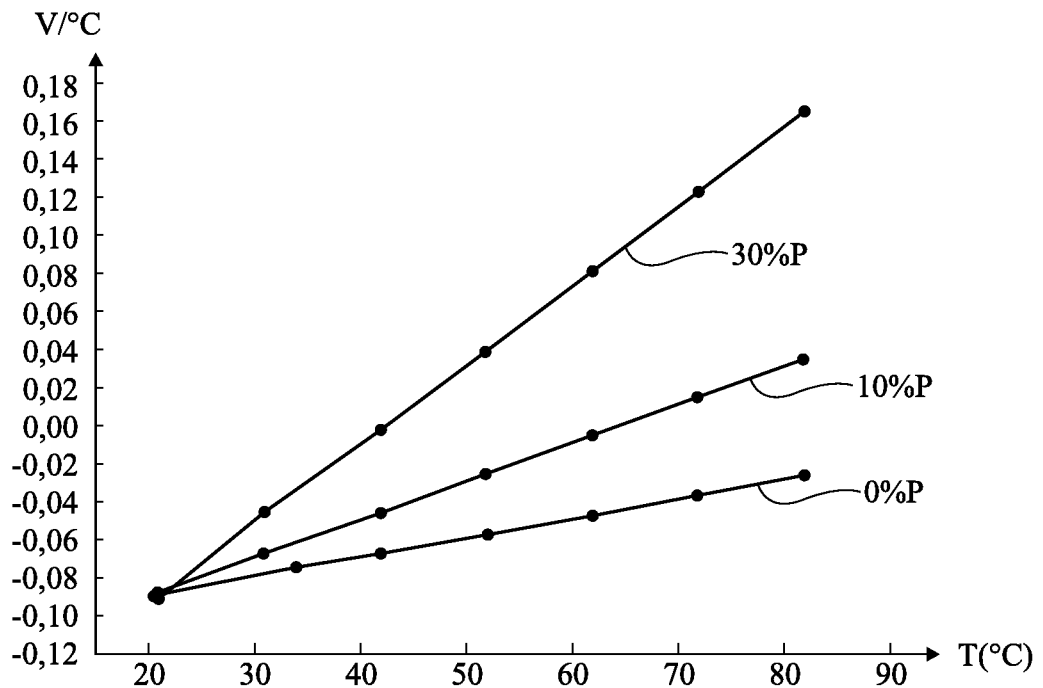
FIG. 7 shows curves of the variation of the sensitivity according to temperature for a plurality of Wheatstone bridges.

FIG. 7 shows curves of the variation of the sensitivity in V/° C. of Wheatstone bridges where the NTC and PTC resistors have been formed either with conventional inks or with inks enriched with 10 or 30% by mass of polymer solution such as described hereabove. The Wheatstone bridges used have the structure shown in FIG. 6. PTC resistors 22, 24 each have a length of 3,000 µm, a width of 800 µm, and a thickness of 5 µm+/−1 µm. NTC resistors 26, 28 each have a deployed length of 2,520 µm, a 500-µm width, and a thickness from 5 µm+/−1 µm.

The polymer has a very strong effect on the sensitivity increase. Sensitivities of 100 mV/° C. at 60° C. may be reached for a temperature sensor supplied at 4.8 V and with 30% by mass of the polymer solution in the two NTC and PTC resistive inks, while with 0% of polymer, the sensitivity is only 30 mV/° C. at 60° C.

Figure 8A:
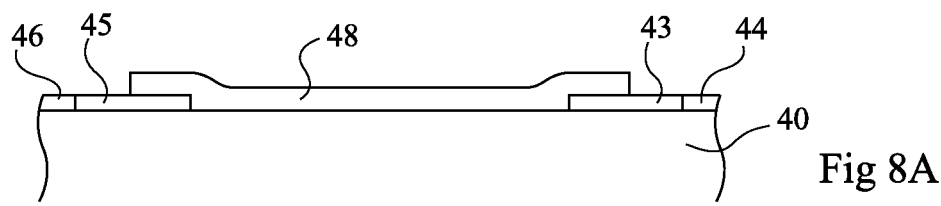
FIGS. 8A and 8B schematically show, in cross-section view and in top view, a resistor with resistive paste.
Figure 8B:
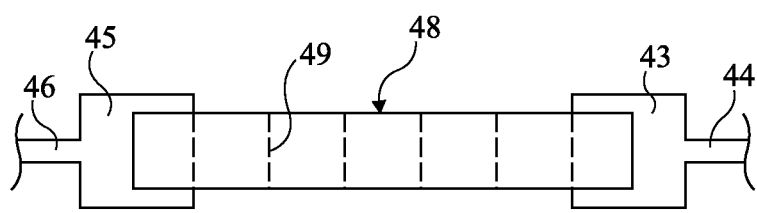

FIGS. 8A and 8B respectively are a cross-section view and a simplified top view of an embodiment of a conventional resistive paste resistor. This resistor is formed on a substrate 40 having conductive pads 43, 45 connected to respective conductive tracks 44, 46 deposited thereon. A resistive track 48 made of a resistive paste, currently by silk screening, is formed between pads 43 and 45. The top view of FIG. 8B shows with dotted lines 49 a square delimitation of resistive track 48 between pads 43 and 45. In the shown example, the track comprises five squares between pads 43 and 45. A thin-film resistive track has a resistance value proportional to the number of squares that it comprises, independently from the dimension of the squares. This resistance value of course also depends on the resistivity of the material and on the thickness of the resistive layer.

Figure 9:
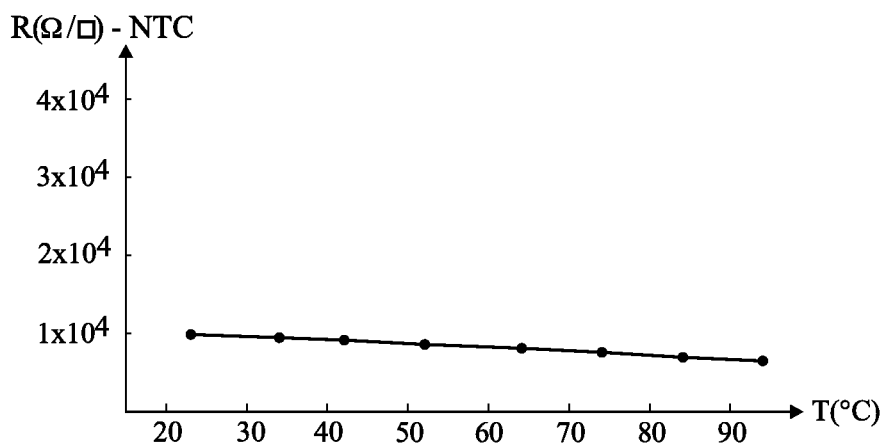
FIG. 9 shows a resistance-vs.-temperature characteristic for a NTC resistor.

FIG. 9 shows an example of a characteristics curve of the value of the resistance per square according to temperature of a resistive paste made of a material of negative temperature coefficient, NTC. This example is given in the case where the NTC material is based on $Sb_2O_5SnO_2$ having a thickness of 5 µm+/−1 µm.

Figure 10:
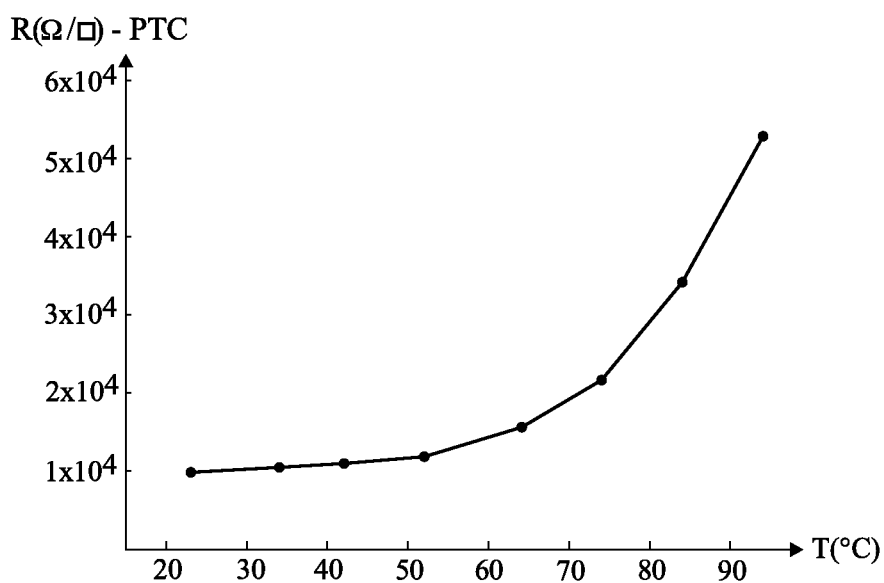
FIG. 10 shows a resistance-vs.-temperature characteristic for a PTC resistor.

FIG. 10 shows an example of a characteristics curve of the value of the resistance per square according to temperature of a resistive paste made of a material of positive temperature coefficient, PTC. This example is given for the case where the PTC material is based on carbon black having a thickness of 8 µm+/−1 µm.

It should be noted that the shapes of the curves of FIGS. 9 and 10 are relatively stable for a given material. If the layer thickness is increased, the curves displace substantially proportionally to themselves.

An object of an embodiment is to make the resistance-vs.-temperature characteristic of resistive paste heat-sensitive resistors adjustable.

According to an embodiment, the detection threshold of a temperature sensor is adjusted to target a defined detection range. According to an embodiment, a PTC paste which has a defined threshold, for example, a 35° C. threshold (that is, substantially no variation of the resistance value according to temperature below 35° C. and an exponential variation above this threshold) is used. To set this threshold, that is, to increase or to decrease it, one uses, in series with the PTC resistor, a NTC resistor which has no threshold but a substantially linear variation of the resistance according to temperature. Further, an adapted polymer may be added in each resistive paste to increase their temperature coefficient of resistance (TCR), that is, to increase their temperature sensitivity. The fact of serializing the PTC and NTC resistors enables to adjust the detection threshold of the PTC sensitive paste. The series assembly of the PTC and NTC resistors may then be integrated in an electric circuit of Wheatstone bridge type.

Figure 11:
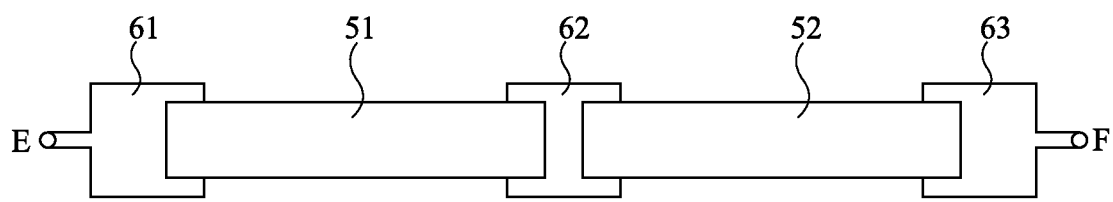
FIGS. 11 and 12 are top views of embodiments of mixed heat-sensitive resistors.

FIG. 11 shows in top view an embodiment of an adjustable mixed resistor. This resistor comprises, in series between two terminals E and F, a first resistive track 51 and a second resistive track 52. The two resistive tracks are made of resistive pastes, for example deposited by silk screening. The two resistive tracks are made of materials having temperature coefficients of opposite signs. It will be considered hereafter that resistor 51 is of positive temperature coefficient type (PTC) and that resistor 52 is of negative temperature coefficient type (NTC). The serializing of the two resistors is ensured due to the fact that first resistive track 51 extends between a conductive pad 61 connected to terminal E and an intermediate conductive pad 62, and that second resistive track 52 extends between intermediate pad 62 and a conductive pad 63 connected to terminal F. The fact for first resistive track 51 to be series-connected with second resistive track 52 means that there are no other electronic components connected to intermediate pad 62.

Figure 12:
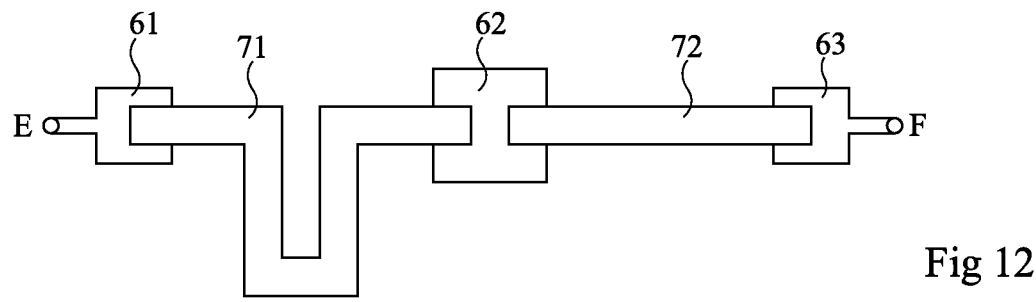

FIG. 12 is a view of another embodiment of a mixed resistor. The same elements as in FIG. 11 are designated with the same reference numerals. The difference between the two drawings is that resistor 51 is replaced with a resistor 71 having a shape with multiple bends to increase the length thereof. Further, resistor 52 is replaced with a resistor 62 of same shape but which does not contain the same number of squares. This is an example only of the many possible topologies for the resistive tracks. In practice, the designer will select the shapes of the resistive tracks according to the topology constraints which are imposed thereto and to the number of squares that each resistive track should comprise.

Figure 13:
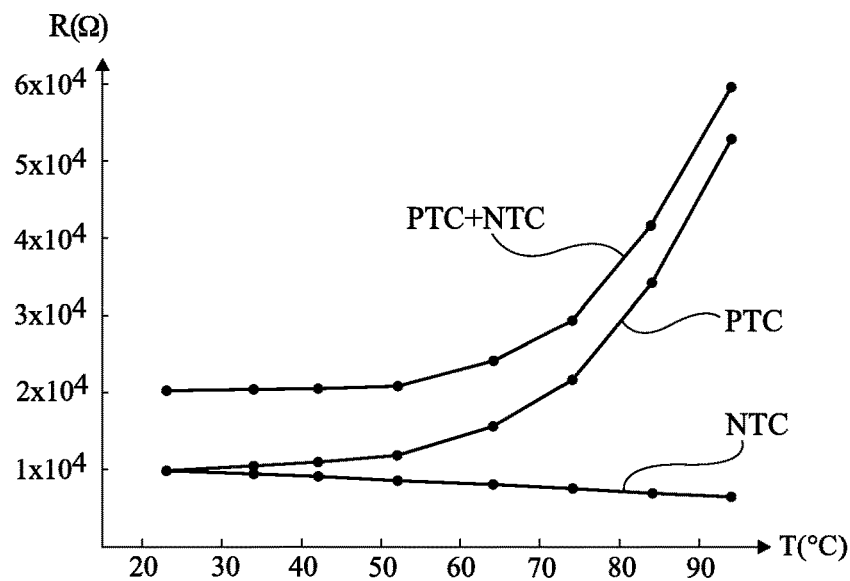
FIG. 13 shows resistance-vs.-temperature characteristics for a NTC resistor, a PTC resistor, and a mixed resistor.

FIG. 13 shows an example of resistance-vs.-temperature characteristic curves for a NTC resistor, a PTC resistor, and a mixed resistor (PTC+NTC). The resistance of the NTC resistor has a substantially linear negative slope according to temperature. The resistance of the PTC resistor initially has a substantially linear positive slope between approximately 20 and approximately 50° C., then follows an exponential curve above a temperature in the order of 50° C. Thus, by serializing a PTC resistor and a NTC resistor, a PTC resistor with a resistance having a substantially zero temperature variation, between 20 and 50° C., and which then increases exponentially beyond a threshold, can be obtained. This enables to provide better marked detection thresholds at selected temperatures. The curves of FIG. 13 are shown in the case where PTC and NTC resistors such as described in relation with FIGS. 9 and 10 have been series-connected, each of the NTC and PTC resistors having a number of squares equal to 9. It should be understood that various adjustments will be made according to the selected number of squares. A mixed resistor with a resistance having an initial variation of negative type and then a clearly positive variation can even be obtained. This provides still better marked thresholds. Such adjustments may be performed by adjusting the number of squares of each of the series-connected resistors.

To obtain more varied variations of the characteristics of mixed resistors, it is here provided to use PTC and NTC resistors modified by addition of a selected proportion of a polymer as previously described. More specifically, it is provided herein to add a polymer to a conventional NTC or PTC resistor ink, for example, an ink based on $Sb_2O_5SnO_2$ for the NTC ink and an ink based on carbon black for the PTC ink. As previously described, the polymer has a dielectric constant in the range from 2 to 3, a molar mass (characterizing the chain length) in the range from 50,000 g/mol to 150,000 g/mol, and a glass transition temperature Tg in the range from 40 to 100° C. This polymer may for example belong to the family of styrenic polymers or to the family of fluorinated polymers.

Thus, by forming mixed resistors where one and/or the other of the NTC and PTC resistors is modified by addition of a variable quantity of a polymer of the above-described type, and by selecting the number of squares of each of these resistors, mixed resistors of desired characteristics may be formed, which have, in particular, a change of slope of their resistance at selected temperatures.

Figure 14A:
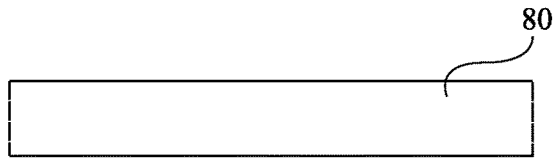
FIGS. 14A to 14D show the structures obtained at steps of an embodiment of a method of manufacturing NTC and PTC resistors.

FIGS. 14A to 14D show the structures obtained at steps of an embodiment of a method of manufacturing mixed resistors comprising the steps of:

(1) Preparing a PEN or PET substrate 80 (FIG. 14A). The PEN and PET substrates are crystalline and have respective glass transition temperatures of 120 and 70° C. The thickness of substrate 80 may be from 50 to 200 µm, for example, 125 µm. A small thickness favors the heat transfer dynamics in the final sensor.

Figure 14B:
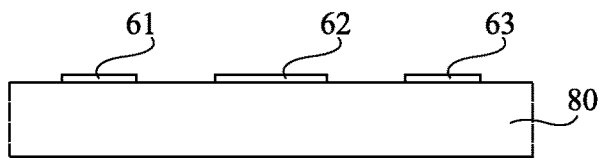

(2) Electrodes 61, 62, 63 forming the electric contacts and the electric tracks of the mixed resistor are deposited and etched (FIG. 14B). Electrodes 61, 62, 63 may be made of Au, Cu, Ag, Ti . . . and may be deposited by physical vapor deposition (PVD). Electrodes made of silver or copper (or even of conductive polymer such as PEDOT:PSS (poly(3,4-ethylenedioxythiophene):poly (styrene sulfonate)) may be deposited by silk screening or by inkjet.

(3) Step (2) is directly followed by a treatment under oxygen plasma with a 50-sccm flow rate and a 80-W power for 60 seconds to remove residues from the surface and improve the adherence of heat-sensitive resistive pastes. A UV/$O_3$ treatment (ultraviolet/ozone) for from 3 to 5 minutes of the substrate is also desirable.

Figure 14C:
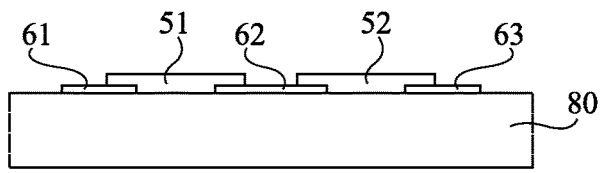

(4) Portions 51, 52 of heat-sensitive NTC and/or PTC resistive pastes possibly doped with polymer are deposited (FIG. 14C). PTC resistive paste portion 51 is formed after NTC resistive paste portion 52 or, conversely, NTC resistive paste portion 52, is formed after PTC resistive paste portion 51. Portion 51 is deposited in contact with conductive pads 61 and 62 and portion 52 is deposited in contact with conductive pads 62 and 63. Each of the depositions may be performed by silk-screening and may be followed by an anneal at 130° C. for from 15 to 30 minutes (preferably for 30 minutes). The thickness of the deposited portions 51, 52 may be from 5 to 15 µm, for example, 10 µm.

When a polymer is provided to be added to the PTC and NTC inks, the evaporation temperature of the solvent present in the ATO ink solution or in the carbon black solution is preferably higher than the evaporation temperature of the solvent present in the polymer solution used to manufacture the NTC and PTC inks Thereby, the solvent present in the polymer solution evaporates before the solvent present in the ATO ink solution or in the carbon black solution. The ATO ink or carbon black solution then spreads into the housings of the polymer network freed by the evaporation of the solvent of the polymer solution. The forming of too significant a porosity of portions 51, 52 after evaporation of all the solvents is thus avoided.

Figure 14D:
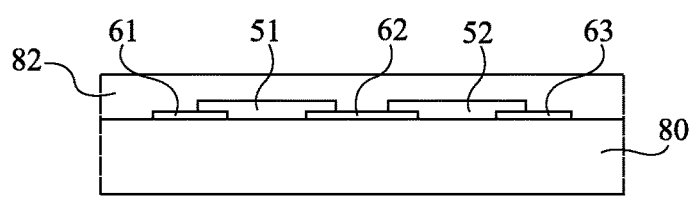

(5) A passivation layer 82 is deposited (FIG. 14D). Layer 82 may be a hydrophobic passivation layer based on a fluorinated polymer of low dielectric constant, in the order of 2. As an example, this deposition is performed by silk-screening or by sputtering or even by inkjet and is followed by an anneal at 100° C. for from 20 to 30 minutes. Step (5) may be absent.

According to an embodiment, resistors based on heat-sensitive pastes are deposited on flexible substrates of PEN (polyethylene naphthalate) or PET (polyethylene terephthalate) type. However, the foregoing also applies to the case where the substrate is a rigid substrate, for example, a glass substrate.

The invention claimed is:

1. A circuit comprising a support and, on the support, a heat-sensitive resistor of negative or positive temperature coefficient, respectively comprising a resistive element based on antimony tin oxide, said resistive element also containing a polymer having a dielectric constant between 2 and 3, a molar mass between 50,000 and 150,000 g/mol, and a glass transition temperature Tg between 40 and 100° C., and wherein the polymer belongs to the family of styrenic polymers or to the family of fluorinated polymers.

2. The circuit of claim 1, wherein the resistive element comprises from 5% to 40% by mass of dry extract of the polymer with respect to the total mass of the resistive element.

3. The circuit of claim 1, wherein the heat-sensitive resistor further comprises a resistive element based on carbon black, said resistive element also containing a polymer having a dielectric constant between 2 and 3, a molar mass between 50,000 and 150,000 g/mol, and a glass transition temperature Tg between 40 and 100° C.

4. The circuit of claim 3, wherein the heat sensitive resistor is of positive temperature coefficient having an adjustable threshold temperature with a resistance which is constant below said threshold and which increases along with temperature above said threshold comprising a first resistive track made of a heat-sensitive paste of positive temperature coefficient, PTC, arranged in electrical series with a second resistive track made of a heat-sensitive paste of negative temperature coefficient, NTC.

5. A method of manufacturing a heat-sensitive resistor of negative or positive temperature coefficient, comprising the steps of:
    forming a first solution comprising antimony tin oxide, said first solution also containing a polymer having a dielectric constant between 2 and 3, a molar mass between 50,000 and 150,000 g/mol, and a glass transition temperature Tg between 40 and 100° C., and wherein the polymer belongs to the family of styrenic polymers or to the family of fluorinated polymers;
    forming portions of the first solution on a support; and
    heating the portions.

6. The method of claim 5, wherein the step of manufacturing the first solution comprises the step of:
    providing a second solution comprising antimony tin oxide or carbon black and a first solvent;
    providing a third solution comprising the polymer and a second solvent; and
    mixing the second and third solutions to provide the first solution.

7. The method of claim 6, wherein the third solution is by a mass proportion smaller than 30%, preferably from 10 to 30% with respect to the total mass of the first solution.

8. The method of claim 6, the third solution comprises from 15 to 30% by mass, for example, 25%, of the polymer in from 85 to 70% by mass, for example, 75%, of the second solvent.

9. The method of claim 6, wherein the first solvent is selected from the group comprising cyclopentanone, ethyl acetate, tetrahydrofuran, acetone, 3-hexanone, and 2-pentanone for antimony tin oxide or the group comprising cyclopentanone, dibutyl carbitol, and ethylene glycol diacetate for carbon black.

10. The method of claim 6, wherein the second solvent has an evaporation temperature in the range from 100 to 170° C.

11. The method of claim 6, wherein the second solvent is selected from the group comprising toluene or butyl acetate for styrenic polymers or perfluorotributylamine (FC43) for fluorinated polymers.

12. The method of claim 6, wherein the evaporation temperature of the first solvent is greater than the evaporation temperature of the second solvent.

13. The method of claim 5, further comprising the steps of:
    forming a fourth solution comprising carbon black containing a polymer having a dielectric constant between 2 and 3, a molar mass between 50,000 and 150,000 g/mol, and a glass transition temperature Tg between 40 and 100° C., and wherein the polymer belongs to the family of styrenic polymers or to the family of fluorinated polymers;
    forming portions of the fourth solution on a support; and
    heating the portions.

14. The method of claim 13 of manufacturing a heat-sensitive resistor of positive temperature coefficient having an adjustable temperature threshold with a resistance which is constant below said threshold and which increases along with temperature above said threshold, comprising the steps of:
    forming in series on the support a first portion made of a heat-sensitive paste of positive temperature coefficient, PTC, and a second portion made of a heat-sensitive paste of negative temperature coefficient, NTC, the first and/or the second portion being formed with the first solution; and
    heating the first and second portions to form first and second resistive tracks.

* * * * *